United States Patent [19]

Alas

[11] Patent Number: 4,634,398
[45] Date of Patent: Jan. 6, 1987

[54] TORSIONAL DAMPER DEVICE COMPRISING TWO COAXIAL PARTS DISPOSED TO ROTATE RELATIVE TO ONE ANOTHER

[75] Inventor: Jacques Alas, Eaubonne, France

[73] Assignee: Valeo, Paris, France

[21] Appl. No.: 702,580

[22] Filed: Feb. 19, 1985

[30] Foreign Application Priority Data

Feb. 23, 1984 [FR] France ................. 84 02762
Feb. 23, 1984 [FR] France ................. 84 02763

[51] Int. Cl.⁴ .............................................. F16D 3/14
[52] U.S. Cl. .............................. 464/68; 192/106.2
[58] Field of Search ................... 192/106.1, 106.2; 464/66, 68

[56] References Cited

U.S. PATENT DOCUMENTS 2,318,620 5/1943 Nutt ............................ 192/106.2

FOREIGN PATENT DOCUMENTS

| | | | |
|---|---|---|---|
| 1530543 | 2/1970 | Fed. Rep. of Germany | 464/68 |
| 2315965 | 10/1973 | Fed. Rep. of Germany | 192/106.2 |
| 2521245 | 8/1983 | France | . |
| 2060819 | 5/1981 | United Kingdom | . |
| 2087043 | 5/1982 | United Kingdom | 464/68 |
| 2089472 | 6/1982 | United Kingdom | 464/68 |
| 2093565 | 9/1982 | United Kingdom | 464/68 |

Primary Examiner—Stuart S. Levy
Assistant Examiner—Daniel P. Stodola
Attorney, Agent, or Firm—Charles E. Brown; Charles A. Brown

[57] ABSTRACT

A torsional damper device suitable for automobile vehicle clutch disks. The torsional damper device comprises two coaxial parts disposed to rotate relative to one another within defined limits of relative angular movement. Friction devices are inserted axially between the coaxial parts and comprise a pressure ring which is acted on by an elastic clamping lug outside the friction area of the pressure ring. This enables the overall size, especially the axial dimension, to be reduced.

21 Claims, 13 Drawing Figures

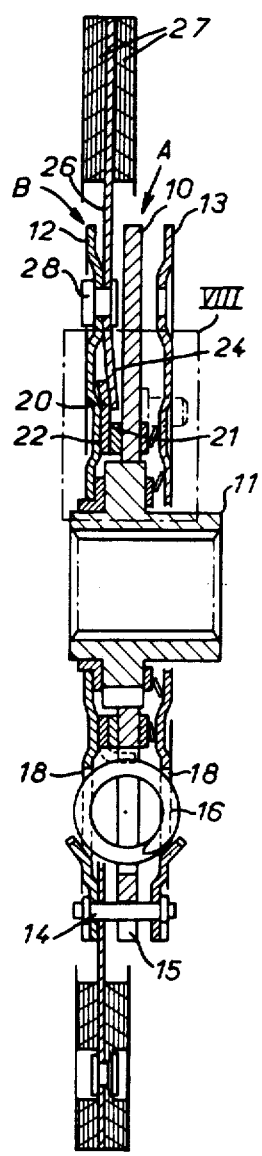
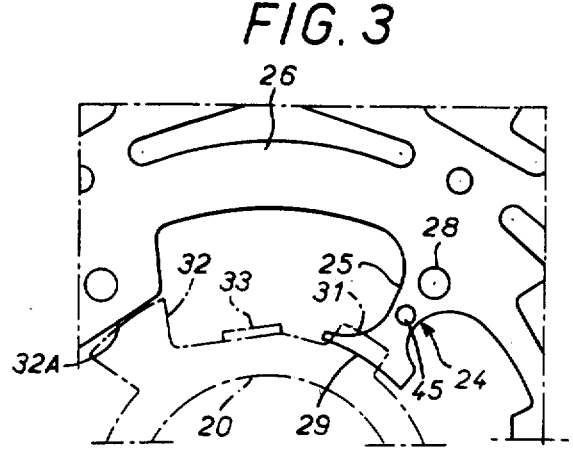
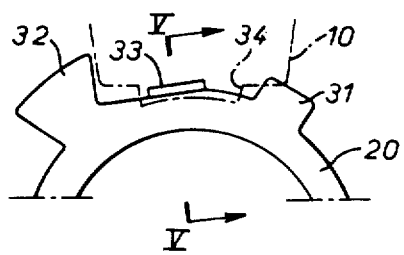
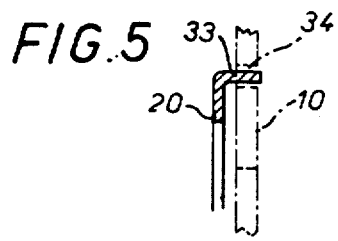
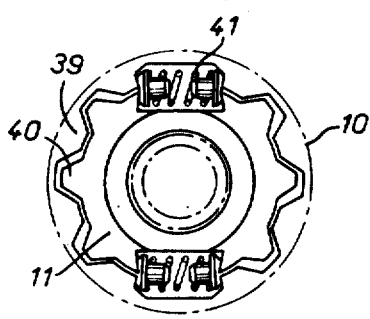

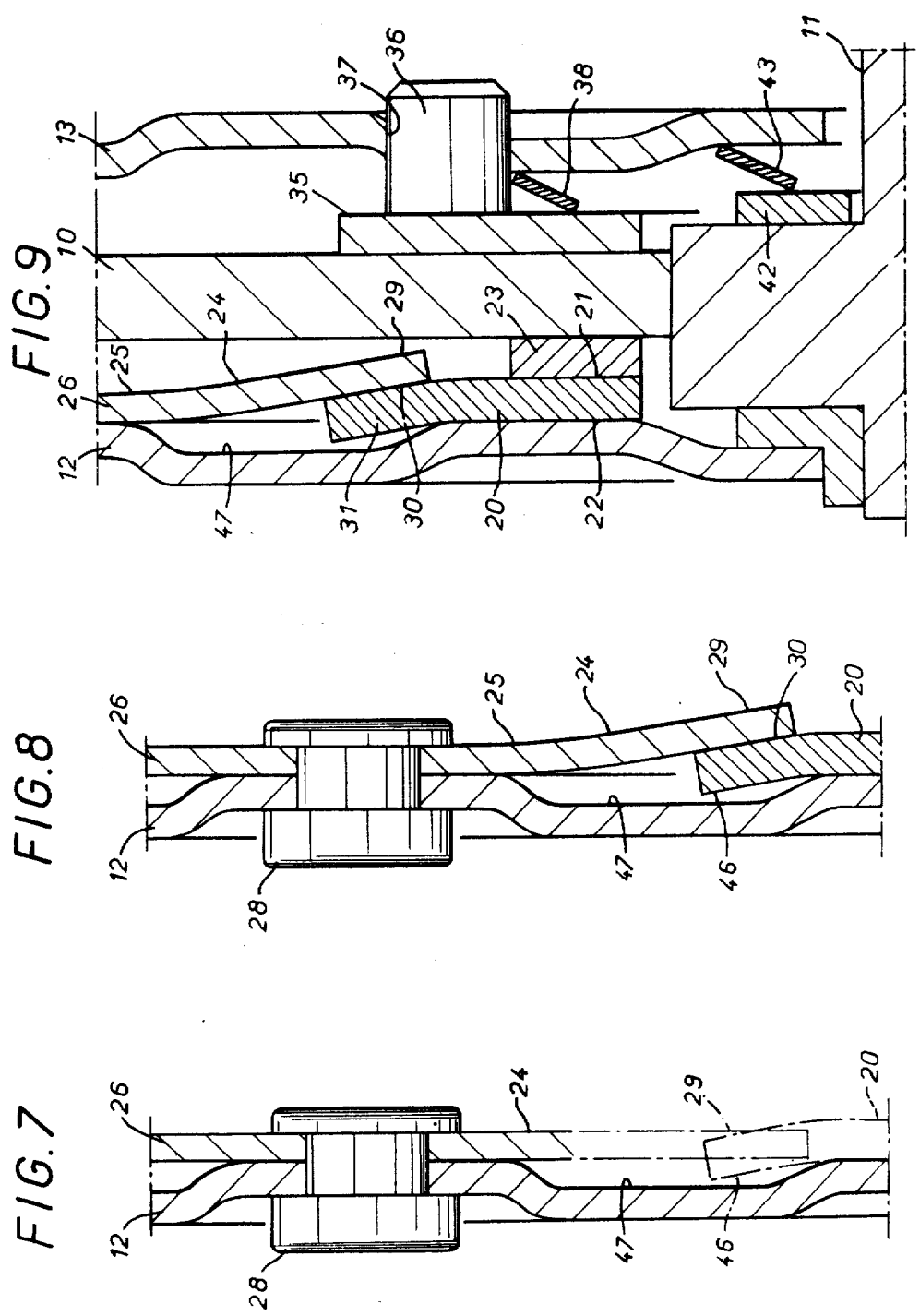

TORSIONAL DAMPER DEVICE COMPRISING TWO COAXIAL PARTS DISPOSED TO ROTATE RELATIVE TO ONE ANOTHER

BACKGROUND OF THE INVENTION

1. Field of the Invention

The present invention relates to a torsional damper device, inter alia for automobile vehicle clutch disks, comprising two coaxial parts disposed to rotate relative to one another within defined limits of relative angular movement and of which one comprises a hub flange and the other comprises two guide rings disposed one on each side of the hub flange, elastic means disposed circumferentially between the coaxial parts and accommodated in openings in the hub flange and in each of the guide rings, and friction means disposed axially between said coaxial parts, said friction means comprising a pressure ring inserted between the hub flange and a first guide ring and having on both sides respective annular friction surfaces.

2. Description of the Prior Art

This type of torsional damper device is normally incorporated in the design of a clutch disk, particularly for automobile vehicles, the hub flange being, in a first type of embodiment, associated with a hub which is designed to be constrained to rotate with a driven shaft, the primary shaft of the automobile vehicle gearbox, for example, whereas one of the guide rings receives a fixed facing carrier which is designed to be coupled to the driving shaft of the automobile vehicle when the clutch is engaged. Alternatively, the hub flange has the facing carrier fixed to it whereas the guide rings are associated with the hub.

The effect of the various friction means operative between the two coaxial parts of the torsional damger device is to introduce a hysteresis effect into the operating characteristics of the device, that is to say to introduce a difference, for a given value of relative angular movement between the coaxial parts of said device, between, on the one hand, the value of the torque transmitted from one of these coaxial parts to the other when the hrelative angular displacement is increasing and, on the other hand, the value of this torque when the relative angular disiplacement is decreasing.

These various friction means further have the effect, when torque is being transmitted, of producing between the coaxial parts of the device friction which is directly proportional to the displacement of the device away from its rest position corresponding to transmission of a null torque.

However beneficial they may be, these various friction means significantly increase the overall size of the torsional damper device, in particular the axial dimension, and do not procure as accurate a value of friction as might be wished.

An object of the present invention is a torsional damper device, inter alia for automobile vehicle clutch disks, of the type indicated hereinabove the operation of which is particularly efficient and which features all desirable characteristics for both direct and retrograde transmission of the torque, with reduced overall size, especially the axial dimension, and a simple and strong structure.

Another object of the invention is a torsional damper device of the type considered in which, with a very simple structure, the magnitude of the friction is adapted to vary according to the relative angular position of the two coaxial parts of the device, with high accuracy.

SUMMARY OF THE INVENTION

The present invention consists in a torsional damper device comprising two coaxial parts disposed to rotate relative to one another within defined limits of relative angular movement, wherein one of said coaxial parts comprises a hub flange and the other comprises two guide rings disposed one on each side of said hub flange, elastic means disposed circumferentially between said coaxial parts, openings adapted to accommodate said elastic means in said hub flange and in each of said guide rings, friction means disposed axially between said coaxial parts and including a pressure ring inserted between said hub flange and a first guide ring having on both sides respective annular friction surfaces, and lugs substantially coplanar with said pressure ring adapted to bring about elastic clamping of said pressure ring against one of said parts and each having a root fastened to one of said parts and an end applied against said pressure ring in a contact area outside the periphery of said friction surfaces of said pressure ring.

By virtue of this arrangement, the overall size of the torsional damper device, especially the axial dimension, is reduced.

Double curvature of the lugs is not necessary, favoring correct regulation of the friction force which depends on the thickness of the pressure ring. To facilitate adjustment of the friction force, the thickness of the pressure ring may be altered, or holes may be formed in the lugs.

In accordance with another characteristic of the invention, the pressure ring features a circumferential series of three types of peripheral flange in regular sequence, comprising contact flanges coplanar with said pressure ring adapted to be contacted by said ends of said lugs, centering flanges substantially coplanar with said pressure ring adapted to bring about centering of said pressure ring relative to the part fastened to the lugs, and drive flanges bent toward the hub flange and engaged with clearance in notches in the other part, not fastened to the lugs.

The content flanges of the pressure ring are ring are preferably bent slightly at the end to improve the conditions of bearing engagement with the lugs.

By virtue of this arrangement the pressure ring which is centered relative to the part fastened to the lugs by virtue of the centering flanges has its contact flanges in rubbing engagement with the lugs which are fastened to the same part. Also, by virtue of the drive flanges which cooperate with the notches in the other part, the pressure ring is adapted to cooperate frictionally with the part fastened to the lugs only from the time at which the drive lugs are effectively driven by the other part. In practice the clearance formed between the bent flanges of the pressure ring and the notches is greater during retrograde operation than during direct operation, so that the pressure ring is not in rubbing engagement with the part fastened to the lugs except during direct operation and this after a predetermined proportion of the relative angular movement between the two coaxial parts of the torsional damper device has taken place.

The friction means preferably further comprise a first friction ring inserted between the pressure ring and the hub flange and a second friction ring inserted between the hub flange and second guide ring. This second friction ring is advantageously constrained to rotate with the second guide ring while an elastic ring is inserted between the second friction ring and the second guide ring.

According to another characteristic of the invention, when the torsional damper device is applied to a clutch disk, in a first type of embodiment a facing carrier is mounted on and fastened to the first guide ring and the lugs are fastened to the facing carrier. In another type of embodiment, the facing carrier is mounted on and fastened to the hub flange and the lugs are fastened to said carrier.

According to another characteristic of the invention, when the torsional damper device is applied to a clutch disk the hub flange is associated with a hub, the hub flange and the hub being mounted with slight circumferential clearance with elastic means acting in opposition to said circumferential clearance, and a third friction ring is inserted between the second guide ring and the hub and an elastic ring is inserted between the third friction ring and the second guide ring.

In accordance with another characteristic of the invention, the end of each lug is shaped so that said elastic clamping is obtained with a force which is variable according to the relative angular position of the aforementioned coaxial parts.

According to another characteristic of the invention, said end of each of said lugs is circumferentially elongate.

According to another characteristic of the invention, each lug is generally crook-shaped, featuring a substantially radial arm between said root and said end.

In one embodiment, said end of each lug has a relatively rigid part adjacent said arm and at least one relatively flexible lateral part.

Alternatively, the end of the lug is ramp-shaped.

Other objects and advantages will appear from the following description of examples of the invention, when considered in connection with the accompanying drawings, and the novel features will be particularly pointed out in the appended claims.

BRIEF DESCRIPTION OF THE DRAWINGS

FIG. 2 is a view of this clutch disk in cross-section on the broken line II—II in FIG. 1.

FIG. 3 is a partial view in elevation of the facing carrier and shows one of the lugs which originate from this carrier, the pressure ring being shown in part in chain-dotted line.

FIG. 4 is a partial view in elevation of the pressure ring and shows one contact flange, one centering flange and one drive flange of the pressure ring, the hub flange being shown in part in chain-dotted line.

FIG. 5 is a corresponding view in cross-section on the line V—V in FIG. 4.

FIG. 6 shows the assembly of the hub flange and the hub with slight circumferential clearance opposed elastically.

FIG. 7 is a view in cross-section and to a larger scale of the first guide ring and shows the plane form of the lug fastened to the facing carrier, prior to contact engagement against the pressure ring.

FIG. 8 is a view analogous to FIG. 7 but after contact engagement of the lug on the pressure ring and shows that this lug remains substantially coplanar with the pressure ring, whilst being displaced by the thickness of the pressure ring.

FIG. 9 is a view, also to a larger scale, of the combination of friction means of the clutch disk.

DESCRIPTION OF THE PREFERRED EMBODIMENTS

Figure 1:
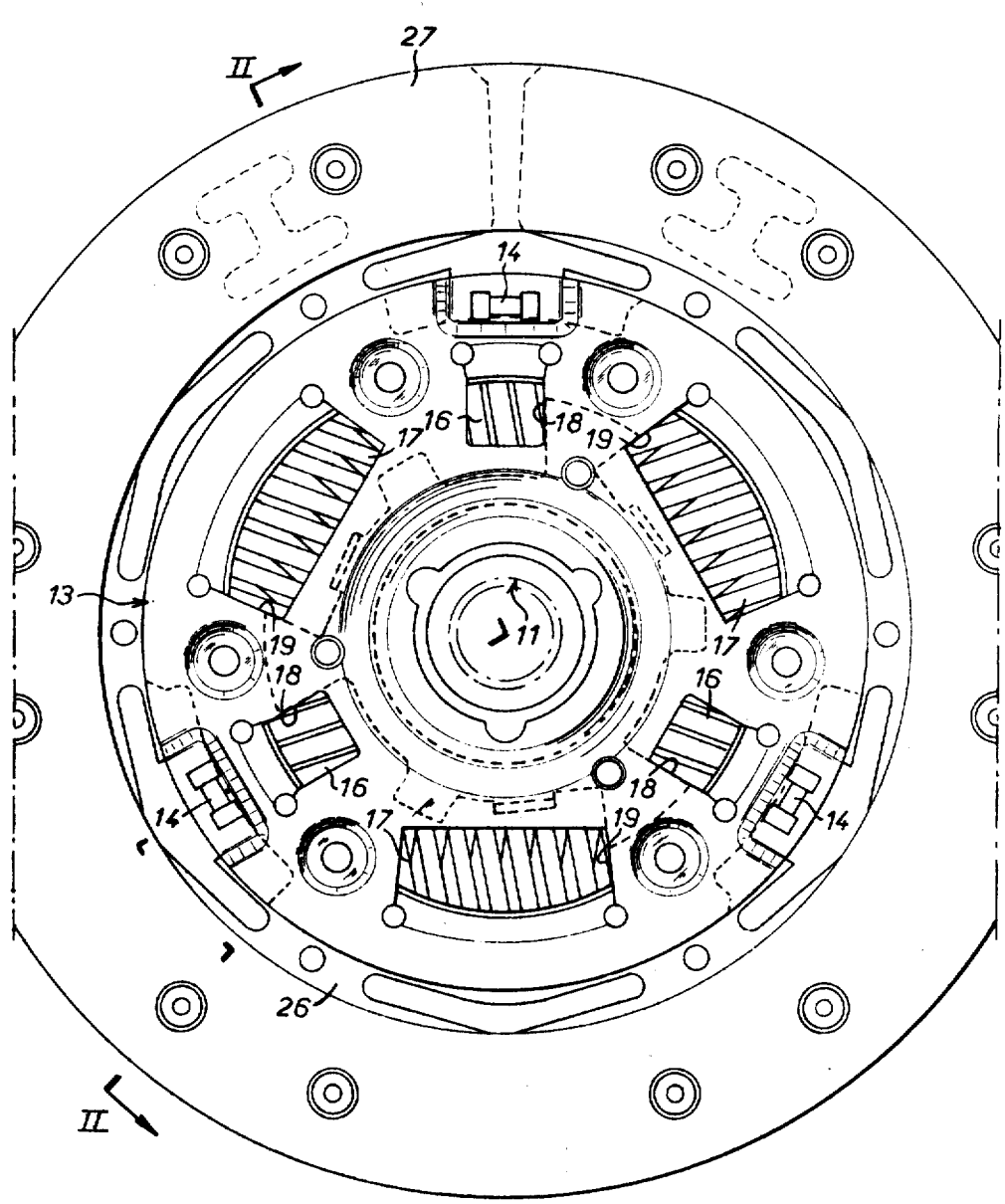
FIG. 1 is a partially cutaway view in elevation of an automobile vehicle clutch disk incorporating a torsional damper device in accordance with the invention.

In the embodiment shown by way of example in FIGS. 1 through 9, a torsional damper device inter alia for automobile vehicle clutch disks comprises two coaxial parts A and B. The parts A and B are disposed to rotate relative to one another within defined limits of relative angular movement.

The part A comprises a hub flange 10 which is associated with a hub 11 designed to be mounted on and constrained to rotate with the primary shaft of the automobile vehicle gearbox.

The part B comprises two guide rings 12 and 13 respectively disposed one on each side of the hub flange 10. The guide rings 12 and 13 are fastened to one another by spacers 14 which pass through peripheral notches 15 in the hub flange 10.

Elastic means 16, 17 are disposed circumferentially between the coaxial parts A and B. These elastic means comprise high-stiffness springs 16 accommodated in openings 18 of relatively smaller circumferential extent formed in the guide rings 12 and 13 and in the hub flange 10 and also springs 17 of lower stiffness accommodated in openings 19 of relatively greater circumferential extent formed in the guide rings 12 and 13 and in the hub flange 10. In practice, the openings 18 in the hub flange are larger than the openings 18 in the rings 12 and 13, whereas all the openings 19 are the same size.

The various openings 18 and 19 are disposed in circumferential series at substantially the same average radius. The openings 18 of relatively smaller circumferential extent alternate with the openings 19 of relatively greater circumferential extent.

Also, friction means are disposed axially between the coaxial parts A and B.

These friction means comprise a pressure ring 20 inserted between the flange 10 and the first guide ring 12. This pressure ring 20 features annular friction facings 21 and 22 on respective sides (FIG. 9). The facing 21 cooperates with the hub flange 10 through the intermediary of a friction ring 23. The facing 22 cooperates directly with the first guide ring 12.

Lugs 24 are provided to clamp the pressure ring 20 elastically against the first guide ring 12.

These lugs 24 are preferably substantially coplanar with the pressure ring 20 and have a root 25 fastened to the part B comprising the guide rings 12 and 13. More specifically, the lugs 24 each have a root 25 which is fastened to a carrier 26 carrying friction facings 27 (FIG. 2). The carrier 26 carrying the facings 27 is fixed by rivets 28 to the first guide ring 12 and is designed to be coupled to the driving shaft of the automobile vehicle when the clutch is engaged, by virtue of being clamped between two plates of this clutch, for example.

Each lug 24 which in this way originates via its root 25 from the carrier 26 carrying the facings 27 features an end 29 which is applied against the pressure ring 20 in a contact area 30 (FIG. 8) which is outside the periphery of the friction facings 21 and 22 of the pressure ring 20. At least one hole 45 is formed in the lug 24 (FIG. 3). By choosing the dimensions of this hole, it is possible to regulate the stiffness of the lug 24 and consequently the friction force at 22.

An arrangement of this kind makes it possible to substantially reduce the overall size, especially the axial dimension, of the torsional damper device.

As is seen in FIG. 7, the end 29 of each of the lugs 24 is, prior to contact engagement against the pressure ring 20, substantially coplanar with this pressure ring 20. The latter has flanges 31 to be described hereinafter which have an end 46 bent towards a depression 47 in the ring 12. This depression 47 is provided for the purposes of accommodating the springs 16 and 17.

Following contact engagement of the end 29 of the lug 24 against the pressure ring 20, the end 29 is in contact over a considerable area (FIG. 8) with the deflected end 46 of the flange 31 of the ring 20. It will be appreciated that this configuration permits reduced overall axial dimensions.

As is seen more specifically in FIGS. 4 and 5, the pressure ring 20 comprises a circular series of three sorts of peripheral flanges 31, 32 and 33 disposed in repetitive sequence: contact flanges 31 substantially coplanar with the pressure ring 20 and adapted to be contacted by the ends 29 of the lugs 24, centering flanges 32 coplanar with the pressure ring and adapted to bring about centering at 32A (FIG. 3) of the pressure ring relative to the carrier 26 carrying the facings 27, and drive flanges 33 (FIGS. 4 and 5) bent towards the hub flange 10 and engaged with clearance in the notches 34 in this hub flange 10.

The friction means of the torsional damper device also comprise the friction ring 23 which is inserted between the pressure ring 20 and the hub flange 10 (FIG. 9). The ring 23 may or may not be fastened to the ring 20.

A second friction ring 35 is also provided and is inserted between the hub flange 10 and the second guide ring 13. This second friction ring 35 is mounted on and constrained to rotate with the second guide ring 13, for example by means of pegs 36 which are fastened to the ring 35 and engaged in holes 37 in the ring 13.

An elastic ring 38 is inserted between the second friction ring 35 and the second guide ring 13 and its effect is to bring about axial elastic clamping between the hub flange 10 and the various rings.

As is seen more specifically in FIG. 6, the hub flange 10 and the hub 11 are mounted with slight circumferential clearance between teeth 39 and 40 of the hub flange 10 and the hub 11, which clearance is elastically opposed by springs 41.

The friction means of the torsional damper device further comprise a third friction ring 42 (FIG. 9) inserted between the second guide ring 13 and the hub 11. An elastic ring 43 is inserted between this third friction ring 42 and the second guide ring 13.

The combination of members 39, 40, 41, 42 and 43 is designed to eliminate so-called dead point noise when the torque is in the vicinity of a null value.

When the torque increases the teeth 39 and 40 come into contact and everything then proceeds as if the friction at 42 were operative between the ring 13 and the hub flange 10. To this friction is added the friction associated with rings 35 and 23.

When the torque is transmitted in the retrograde direction, the clearance between the drive flanges 33 of the pressure ring 20 and the notches 34 of the hub flange 10 is too large for the pressure ring 20 to be entrained by the hub flange 10. On the other hand, when the torque is transmitted in the forward direction, the clearance between the drive flanges 33 of the pressure ring 20 and the notches 34 of the hub flange is absorbed after a predetermined fraction of the relative angular movement between the parts A and B and subsequently the pressure ring 20 is entrained by the hub flange 10, which introduces supplementary friction at 22 between the pressure ring 20 and the guide ring 12 which is added to the friction at 42, 35 and 23. It will be noted that the springs 16 and/or 17, by contacting the flange 32, tend to return the device to a neutral position.

It will be appreciated that the torsional damper device, inter alia for automobile vehicle clutch disks, provides for excellent operation in the forward and retrograde directions with significantly reduced overall size, especially the axial dimension, and with a simple and rugged construction.

Figure 10:
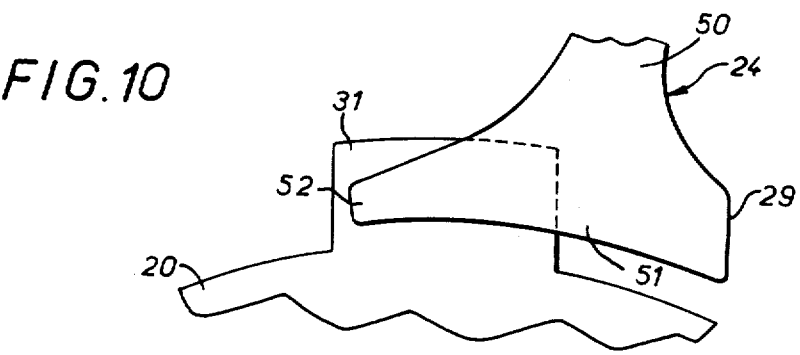
FIG. 10 shows one lug originating from the facing carrier and a flange of the pressure ring against which this lug is applied, in one relative angular position of the two coaxial parts of the torsional damper device.
Figure 11:
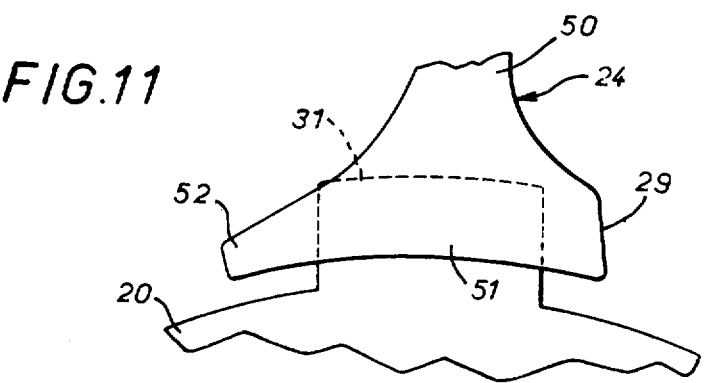
FIG. 11 is a view analogous to FIG. 10 but for another relative angular position of the two coaxial parts of the torsional damper device.

Referring now to FIGS. 10 and 11, it is seen that the end 29 of each lug 24 is shaped so as to render the force clamping the pressure ring 20 against the first guide ring 12 variable according to the relative angular position of the parts A and B (one such position is shown in FIG. 10 and another in FIG. 11).

More specifically, the end 29 is circumferentially elongate. The lug 24 is generally crook-shaped (FIGS. 3 and 10) featuring a substantially radial arm 50 between the root 25 of the lug 24 and the end 29 of the lug 24. This end 29 features (FIG. 10) a part 51 adjacent the arm 50 which is relatively rigid and at least one relatively flexible free lateral part 52.

Thus when it is the rigid part 51 (FIG. 11) which is in contact with the flange 31 of the pressure ring 20, the axial clamping elastic force is greater than when it is the flexible part 52 (FIG. 10) which is in contact with the flange 31. The lug 24 advantageously comprises at least one hole 45 (FIG. 3) for improved flexibility.

The supplementary friction at 22 (FIG. 9) is governed by an elastic clamping force which is rendered variable by virtue of the shaping of the end 29 of the lugs 24, according to the relative angular position of the parts A and B. When the flexible part 52 of the end 29 is, for a given torque, in contact with the flange 31 of the pressure ring 20, the clamping force is relatively low (FIG. 10), increasing when, for a higher torque, is the rigid part 41 of the end 29 of the lug 24 which comes into contact with the flange 31 of the pressure ring. The springs 16 and/or 17, through contact with the flange 32, tend to return the device to a neutral position.

Figure 12:
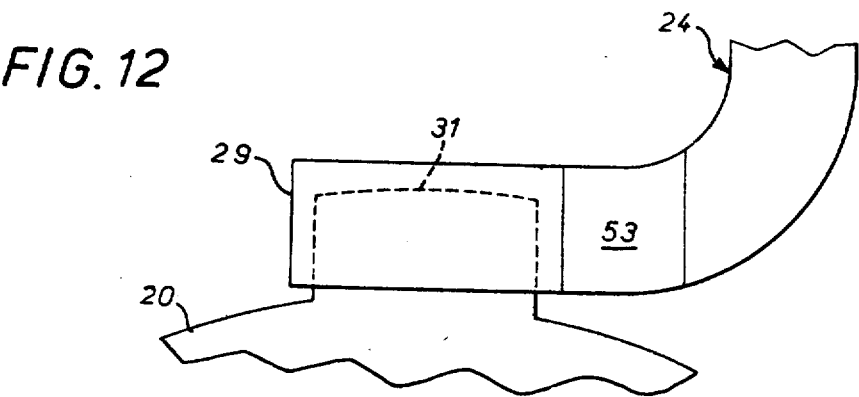
FIG. 12 is a view analogous to FIG. 10 or FIG. 11 but relating to an alternative lug.
Figure 13:
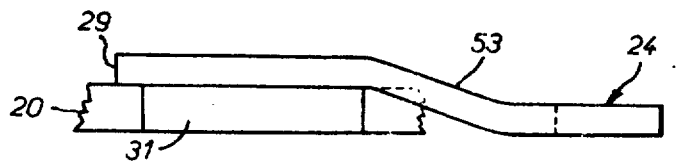
FIG. 13 is a corresponding plan view.

In an alternative embodiment (FIGS. 12 and 13), the arrangement is analogous to that which has just been described but the end 29 of the lugs 24 is in this instance shaped as a ramp 53 so that, as previously, the clamping force at 22 is varied as a function of the relative angular position of the parts A and B.

It should be noted that the end 29 of the lugs 24 may be shaped as shown in FIGS. 10 and 11 and simultaneously provided with a ramp such as the ramp 53 of FIGS. 10 and 11.

It will be understood that various changes in the details, materials and arrangements of parts which have been herein described and illustrated in order to explain the nature of the invention may be made by those skilled in the art within the principle and scope of the invention as expressed in the appended claims.

For example, the guide ring could be fastened to the hub and the hub flange mobile relative to the hub. In this case, the lugs 29 are fastened to the hub flange and the drive flanges are adapted to engage with the guide ring while the pressure ring rubs on the hub flange. A friction ring may be provided on each side of the pressure ring. It will be noted that the lugs 24 forming part of one of the parts A and B could act axially on the pressure ring 20 for the purposes of clamping, not onto the part of which it forms part, but onto the other part, namely the hub flange 10 in the FIG. 2 situation.

There is claimed:

1. Torsional damper device comprising two coaxial parts disposed to rotate relative to one another within defined limits of relative angular movement, wherein one of said coaxial parts comprises a hub flange and the other comprises first and second guide rings disposed one on each side of said hub flange, elastic means disposed circumferentially between said coaxial parts for resisting relative angular movement of said coaxial parts, said elastic means comprising at least one spring which extends substantially tangentially to a circumference of said coaxial parts, openings adapted to accommodate said elastic means in said hub flange and in each of said guide rings, friction means disposed axially between said coaxial parts frictionally engageable between said coaxial parts and including a pressure ring interposed between said hub flange and said first guide ring, said pressure ring having on both sides respective annular friction surfaces, and lugs elastically clamping said pressure ring against one of said parts and each lug having a root fastened to one of said parts and an end partially in radial alignment with said pressure ring and bearing against said pressure ring in a contact area radially outwardly of the external periphery of said friction surfaces of said pressure ring.

2. Device according to claim 1, wherein said lugs are adapted to bring about elastic clamping of said pressure ring against said first guide ring.

3. Device according to claim 1, wherein said pressure ring features peripheral contact flanges substantially coplanar with said pressure ring and adapted to be contacted by said ends of said lugs.

4. Device according to claim 3, wherein said contact flanges feature an end which is bent to provide a large area of contact with said ends of said lugs.

5. Device according to claim 1, wherein said pressure ring features peripheral centering flanges coplanar with said pressure ring and adapted to bring about centering of said pressure ring relative to that of said coaxial parts which comprises said guide rings.

6. Device according to claim 1, wherein said pressure ring features peripheral drive flanges bent towards said hub flange and engaged with clearance in notches in said hub flange.

7. Device according to claim 1, wherein said pressure ring features a circumferential series of three types of peripheral flange in regular sequence, comprising contact flanges substantially coplanar with said pressure ring and adapted to be contacted by said ends of said lugs, centering flanges coplanar with said pressure ring and adapted to bring about centering of said pressure ring relative to that of said coaxial parts which comprises said guide rings, and drive flanges bent towards said hub flange and engaged with clearance in notches in said hub flange.

8. Device according to claim 1, wherein said friction means further comprise a first friction ring inserted between said pressure ring and said hub flange.

9. Device according to claim 1, wherein said friction means further comprise a second friction ring inserted between said hub flange and said second guide ring.

10. Device according to claim 9, wherein said second friction ring is constrained to rotate with said second guide ring.

11. Device according to claim 9, further comprising an elastic ring inserted between said second friction ring and said second guide ring.

12. Device according to claim 1, further comprising a facing carrier fastened to said first guide ring, said lugs being integral with said facing carrier.

13. Device according to claim 1, further comprising a hub associated with said hub flange, said hub flange and said hub being mounted with slight circumferential clearance, elastic means acting in opposition to said circumferential clearance, a second friction ring inserted between said second guide ring and said hub and an elastic ring inserted between said second friction ring and said second guide ring.

14. Device according to claim 1, wherein said end of each lug defines means for applying said elastic clamping which is variable as a function of the relative angular position of said coaxial parts.

15. Device according to claim 14, wherein said end of each lug is circumferentially elongate.

16. Device according to claim 14, wherein each of said lugs is generally crook-shaped, featuring a substantially radial arm between said root and said end.

17. Device according to claim 16, wherein said end of each lug has a relatively rigid part adjacent said arm and at least one relatively flexible lateral part.

18. Device according to claim 14, wherein said end of each lug is ramp-shaped.

19. Device according to claim 14, wherein said end of each lug cooperates with a peripheral flange on said pressure ring.

20. Device according to claim 14, wherein said pressure ring further comprises drive flanges bent towards said hub flange and engaged with clearance in notches in said hub flange.

21. Device according to claim 14, further comprising a facing carrier fastened to said first guide ring, said lugs being integral with said facing carrier.

* * * * *